US012412429B2

(12) United States Patent
Alfonsetti et al.

(10) Patent No.: US 12,412,429 B2
(45) Date of Patent: Sep. 9, 2025

(54) METHODS AND SYSTEMS FOR MANAGING DATA STORAGE IN VEHICLE OPERATIONS

(71) Applicant: Volkswagen Group of America Investments, LLC, Reston, VA (US)

(72) Inventors: Daniel Alfonsetti, Auburn, ME (US); John Russell Lepird, Pittsburgh, PA (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 247 days.

(21) Appl. No.: 17/818,986

(22) Filed: Aug. 11, 2022

(65) Prior Publication Data

US 2024/0054822 A1 Feb. 15, 2024

(51) Int. Cl.
*G07C 5/00* (2006.01)
*G07C 5/12* (2006.01)

(52) U.S. Cl.
CPC ............... *G07C 5/008* (2013.01); *G07C 5/12* (2013.01)

(58) Field of Classification Search
CPC ........... G07C 5/008; G07C 5/12; G07C 5/085
See application file for complete search history.

(56) References Cited

U.S. PATENT DOCUMENTS 8,584,586 B1 * 11/2013 Pugsley ................... B63G 9/06 114/240 R
8,949,611 B1 * 2/2015 Kimberly ................ G06F 21/51 713/176
11,824,743 B2 * 11/2023 Floyd ................. H04B 7/18506
2010/0033581 A1 * 2/2010 Mollov ..................... G06T 1/20 348/207.1
2015/0363981 A1 * 12/2015 Ziarno .................... H04L 67/12 701/1

(Continued)

FOREIGN PATENT DOCUMENTS

CN 112734982 A 4/2021
CN 115422178 A 12/2022

(Continued)

OTHER PUBLICATIONS

International Search Report and Written Opinion for PCT/US2023/025996 dated Oct. 26, 2023, 10 pages.

(Continued)

*Primary Examiner* — Rami Khatib
(74) *Attorney, Agent, or Firm* — Fox Rothschild LLP

(57) ABSTRACT

This document discloses system, method, and computer program product embodiments for managing data generated by one or more systems of a vehicle. In various embodiments, a processor onboard a vehicle receives messages generated by one or more onboard systems of the vehicle. The system saves a first set of the messages to a first storage location on the vehicle according to a first data logging policy. The system processes a second set of the messages to reduce data elements and yield offboard data that is designated for offboard use. The first and second sets of messages may or may not overlap with each other. The system saves the offboard data to a second storage location that is onboard the vehicle and subject to a second data logging policy. The second data logging policy differs from the first data logging policy.

24 Claims, 6 Drawing Sheets

(56) References Cited

U.S. PATENT DOCUMENTS

| | | | | |
|---|---|---|---|---|
| 2016/0233948 | A1* | 8/2016 | Le Bigot | G07C 5/0808 |
| 2019/0071067 | A1* | 3/2019 | Leone | B60W 30/18018 |
| 2021/0337387 | A1 | 10/2021 | Ueno et al. | |

FOREIGN PATENT DOCUMENTS

| | | | |
|---|---|---|---|
| EP | 2680534 | A1 | 1/2014 |
| WO | 2019144096 | A1 | 7/2019 |

OTHER PUBLICATIONS

Ulm, G. et al., OODIDA: On-Board/Off-Board Distributed Real-Time Data Analytics for Connected Vehicles, Data Science and Engineering (2021) 6:102-117.

Bouderbal et al., How Would Image Down-Sampling and Compression Impact Object Detection in the Context of Self-driving Vehicles, ResearchGate, Feb. 2021.

Havers et al., DRIVEN: a framework for efficient Data Retrieval and clusterIng in VEhicular Networks, 2019 IEEE 35th International Conference on Data Engineering.

* cited by examiner

METHODS AND SYSTEMS FOR MANAGING DATA STORAGE IN VEHICLE OPERATIONS

BACKGROUND

Modern vehicles, and especially autonomous vehicles that include systems that provide self-driving capabilities, are designed to operate processes that share messages with each other. As with many systems, vehicles have limited onboard data storage capacity. Therefore, improved methods and systems for data storage are needed.

This document describes methods and systems that are directed to addressing the problems described above, and/or other issues.

SUMMARY

This document discloses system, method, and computer program product embodiments for managing data generated by one or more systems of a vehicle. In various embodiments, a processor onboard a vehicle receives messages generated by one or more systems that are onboard the vehicle. The system saves a first set of the messages to a first storage location on the vehicle according to a first data logging policy. The system processes a second set of the received messages to reduce data elements and yield offboard data that is designated for offboard use. The system saves the offboard data to a second storage location that is onboard the vehicle and subject to a second data logging policy. The second data logging policy differs from the first data logging policy. The first set of messages and the second set of messages may be unique sets of messages, may be identical to each other, or may include some messages that are in common and some messages that differ.

BRIEF DESCRIPTION OF THE DRAWINGS

The accompanying drawings are incorporated into this document and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
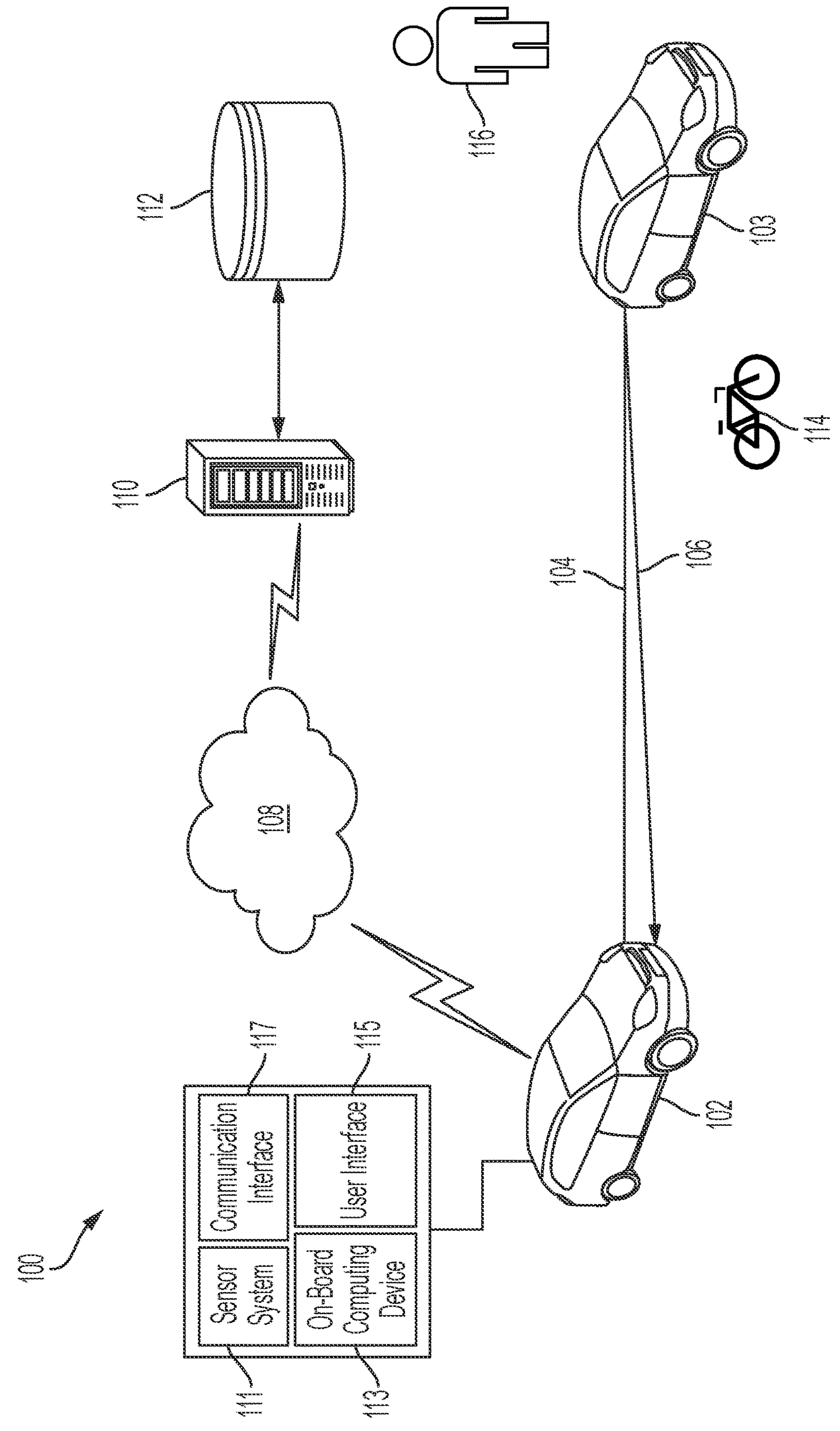
FIG. 1 illustrates an example system that includes a vehicle configured to capture and process data, along with an offboard processing system.

Vehicles, and especially autonomous vehicles, include many processes that share messages with each other. It can be useful to save many of these messages for transfer to an offboard system for offboard data analysis. "Offboard" refers to a process that does not run on a system that is a component of the vehicle. In contrast, "onboard" processes run on one or more systems that are components of the vehicle. Offboard systems can use such data to learn about the vehicle's operations, to train machine learning systems of both that vehicle and other vehicles, to update map information, for reporting to external systems or entities, and/or for other purposes. However, the computing systems onboard a vehicle have a finite data storage capacity, and modern vehicles generate a massive amount of data during operation. When a vehicle's onboard storage capacity is full, the vehicle may need to alter or stop its operations. This creates a data storage optimization problem, in that a vehicle needs to reduce data storage requirements while still storing as much data as is needed or useful for later offboard analysis.

This document describes system, apparatus, device, method and/or computer program product embodiments, and/or combinations and sub-combinations of any of the above, for managing data generated by various systems of a vehicle, and in particular methods of identifying and storing data that will be used for offboard analysis.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In this document, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Definitions for additional terms that are relevant to this document are included at the end of this Detailed Description.

Notably, this document describes the present solution in the context of an autonomous vehicle. However, the present solution is not limited to vehicular applications. The present solution may be used in other applications such as other robotic applications, manufacturing system applications, enterprise data management applications, and/or system performance applications.

FIG. 1 illustrates an example system 100 in accordance with various aspects of the disclosure. System 100 includes a vehicle 102 that is traveling along a road in a semi-autonomous or autonomous manner. This document may sometimes refer to vehicle 102 as AV 102, although this disclosure is not necessarily limited to autonomous vehicles. AV 102 can include, but is not limited to, a land vehicle (as shown in FIG. 1), an aircraft, or a watercraft. As noted above, except where specifically noted this disclosure is not necessarily limited to AV embodiments, and it may include non-autonomous vehicles in some embodiments.

AV 102 includes one or more subsystems that are configured to collect data about the AV's environment and process that data to detect objects in its proximity. The objects can include, but are not limited to, a vehicle 103, cyclist 114 (such as a rider of a bicycle, electric scooter, motorcycle, or the like), and/or a pedestrian 116.

To collect this data, the AV 102 may include a sensor system 111, an on-board computing device 113, a communications interface 117, and a user interface 115. Autonomous vehicle system 101 may further include certain components (as illustrated, for example, in FIG. 5) included in vehicles, which may be controlled by the on-board computing device 113 using a variety of communication signals and/or commands, such as, for example, acceleration signals or commands, deceleration signals or commands, steering signals or commands, braking signals or commands, etc.

Figure 5:
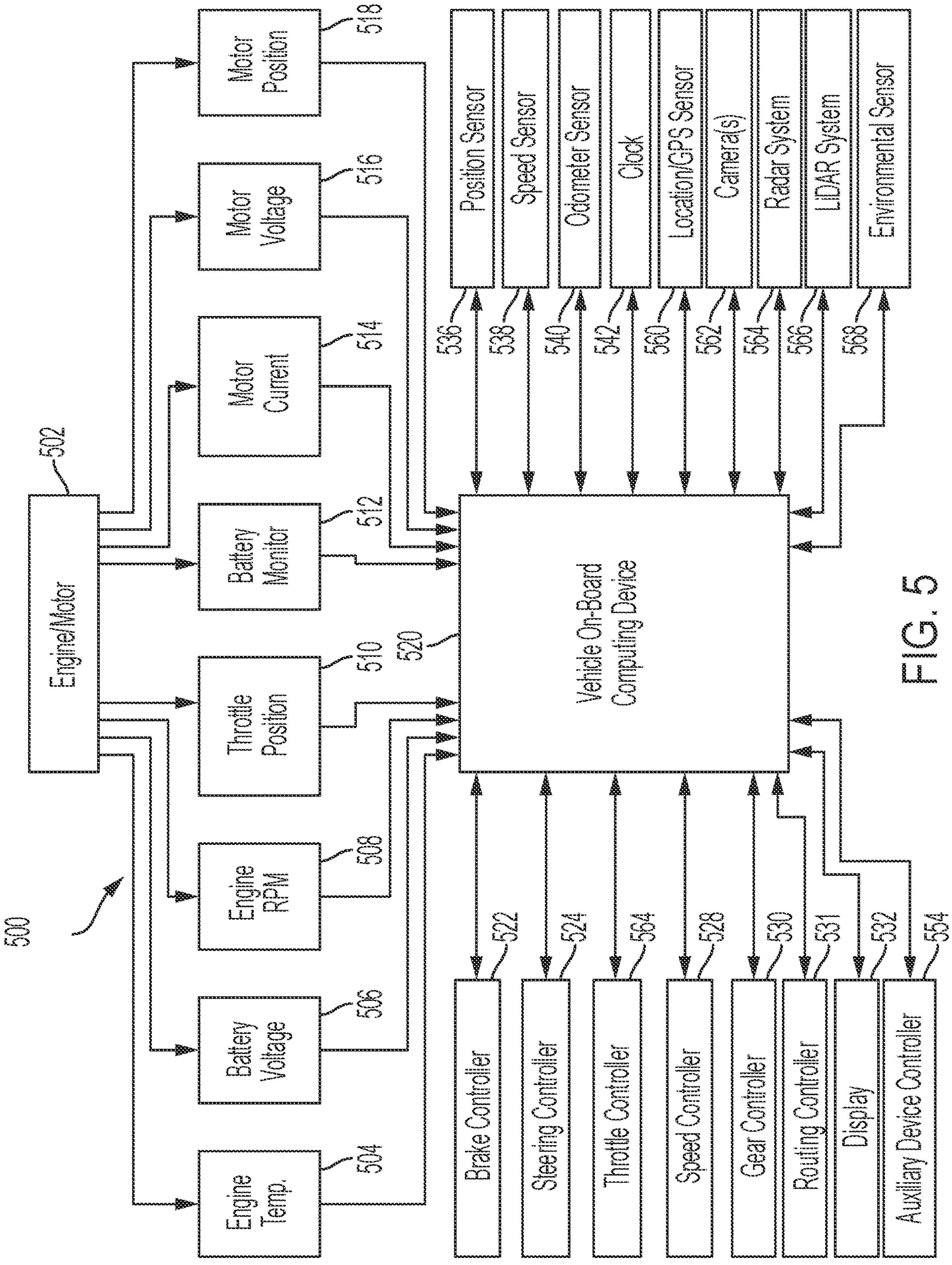
FIG. 5 illustrates an example architecture for a vehicle, in accordance with aspects of the disclosure.

The sensor system 111 may include one or more sensors that are coupled to and/or are included within the AV 102, as illustrated in FIG. 5. For example, such sensors may include, without limitation, a light detection and ranging (lidar) system, a radio detection and ranging (radar) system, a laser detection and ranging (LADAR) system, a sound navigation and ranging (sonar) system, one or more cameras (for example, visible spectrum cameras, infrared cameras, etc.), temperature sensors, position sensors (for example, a global positioning system (GPS), etc.), location sensors, fuel sensors, motion sensors (for example, an inertial measurement unit (IMU), etc.), humidity sensors, occupancy sensors, or the like. The sensor data can include information that describes the location of objects within the surrounding environment of the AV 102, information about the environment itself, information about the motion of the AV 102, information about a route of the vehicle, or the like. As AV 102 travels over a surface, at least some of the sensors may collect data pertaining to the surface.

The AV 102 may also communicate sensor data collected by the sensor system to an offboard, remote computing device 110 (for example, a cloud processing system) over communications network 108. Remote computing device 110 may be configured with one or more servers to process data as described in this document. Remote computing device 110 may also be configured to communicate data/instructions to/from AV 102 over network 108, to/from server(s) and/or database(s) 112. The offboard computing device 110 may receive data that the vehicle collected during its run, such as perception data and operational data. The offboard computing device 110 also may transfer data or other information to the vehicle such as software updates, high definition (HD) map updates, machine learning model updates and other information.

Network 108 may include one or more wired or wireless networks. For example, the network 108 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 102 may retrieve, receive, display, and edit information generated from a local application or delivered via network 108 from database 112. Database 112 may be configured to store and supply raw data, indexed data, structured data, map data, program instructions, or other configurations as is known.

The communications interface 117 may be configured to allow communication between AV 102 and external systems, such as, for example, external devices, sensors, other vehicles, servers, data stores, databases, etc. The communications interface 117 may utilize any now or hereafter known protocols, protection schemes, encodings, formats, packaging, etc. such as, without limitation, Wi-Fi, an infrared link, Bluetooth, etc. The user interface system 115 may be part of peripheral devices implemented within the AV 102 including, for example, a keyboard, a touch screen display device, a microphone, or a speaker. The vehicle also may receive state information, descriptive information or other information about devices or objects in its environment via the communication interface 117 over communication links such as those known as vehicle-to-vehicle, vehicle-to-object or other V2X communication links. The term "V2X" refers to a communication between a vehicle and any object that the vehicle may encounter or affect in its environment.

Figure 2:
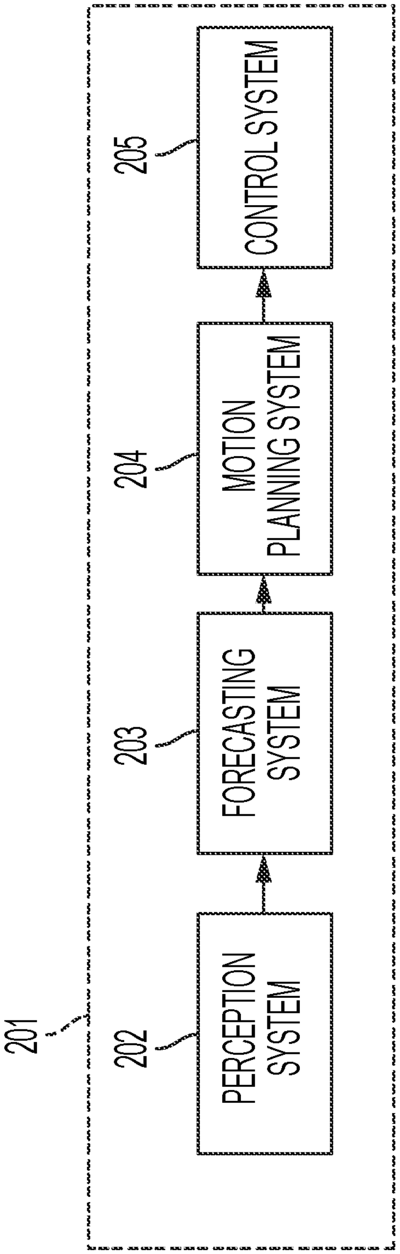
FIG. 2 is a block diagram that illustrates various subsystems of an autonomous vehicle.

As noted above, modern vehicles generate large amounts of data during operation. Example systems onboard a vehicle are shown in the block diagram of FIG. 2. A vehicle's perception system 202 will capture information about objects in, and features of, the vehicle's environment. A vehicle's forecasting system 203 will generate predictions about the actions that other actors in the environment may take. The vehicle's motion planning system 204 and control system 205 will generate data and instructions that cause the vehicle to move in the environment. Various components of these systems will be described in the discussion of FIG. 5 below in this document. Certain components of these systems also may be embodied in processor hardware and computer-readable programming instructions that are part of the vehicle's onboard computing system 201.

The perception system 202 includes sensors that capture information about moving actors and other objects that exist in the vehicle's immediate surroundings. Example sensors include cameras, lidar systems, and radar systems. The data captured by such sensors (such as a digital image, lidar point cloud data, or radar data) is known as perception data. The perception system may include one or more processors, along with a computer-readable memory with programming instructions and/or trained artificial intelligence models that, during a run of the vehicle, will process the captured data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in "Yurtsever et al., A Survey of Autonomous Driving: Common Practices and Emerging Technologies" (arXiv Apr. 2, 2020).

If the vehicle is an AV, the vehicle's perception system 202 may deliver the perception data that it captures to the vehicle's forecasting system 203. The forecasting system 203 (which also may be referred to as a prediction system) will include processors and computer-readable programming instructions that are configured to process data received from the perception system and forecast actions of other actors that the perception system detects.

In an AV, the vehicle's perception system 202, as well as the vehicle's forecasting system 203, will deliver data and information to the vehicle's motion planning system 204 and motion control system 205 so that the receiving systems may assess such data and initiate any number of reactive motions to such data. The motion planning system 204 and control system 205 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause the vehicle hardware to take include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in IEEE Transactions on Intelligent Transportation Systems, vol. 17, no. 4 (April 2016).

In non-AV embodiments, such as with vehicles that are driven by human operators, the motion planning system 204 may be embodied in processor hardware and computer-readable hardware that are part of electronic devices that are contained within the vehicle, such as a dashboard navigation system or a mobile electronic device of the operator. In such situations, the electronic device may output the trajectories planned by the motion planning system via a display, an audio speaker, or both. In addition, some parts of the perception system 202 may include a transceiver of an electronic device that receives certain perception data (such as weather data) from a remote server via wireless communication.

Some elements of the data generated by the vehicle subsystems described above may be needed for onboard processes but not necessary for offboard analysis. Other data elements may be more useful for offboard analysis than onboard operations.

For example, a vehicle subsystem may generate a message with data fields x, y and z, all of which are necessary for onboard processes. Only data fields x and y may be needed for offboard processes. However, because all of these data elements are contained in a single message, the vehicle must store the message and thus bear the storage cost for all three data fields, even though one-third of the message content is not needed. As used in this discussion, a "message" is a set of data bundled into a single unit according to a communication protocol of the communication system via which the message is sent. The relation of elements of the message may be implemented by a message header, an envelope, or another structure such that any one data element is not typically accessed without accessing at least some other elements contained in the body of the message.

Alternatively, some onboard messages may not need to be stored for onboard operations at all (other than in short-term memory for immediate use). However, if such messages are useful for offboard analysis, they must be stored in onboard disk storage, thus increasing storage cost and decreasing the vehicle's remaining storage capacity.

In addition, onboard systems can generate messages at a higher frequency than is needed for offboard analysis. By way of example, if a vehicle subsystem generates a particular message at a frequency of 10 Hz, but a frequency of 1 Hz would yield sufficient data for offboard analysis, the system will log ten times more data than it needs for offboard analysis.

To address this, the present disclosure describes a translation layer, implemented onboard a vehicle, that performs what may be referred to as a data scribe task on vehicle-generated data to decouple onboard and offboard data. The data scribe task receives messages generated onboard the vehicle, and it extracts from each message the data fields that are needed for offboard analysis. The data scribe task then applies a logging policy to the extracted data that is independent of the logging policy that the system applied to the onboard messages, thereby decoupling the onboard and offboard data.

Figure 3:
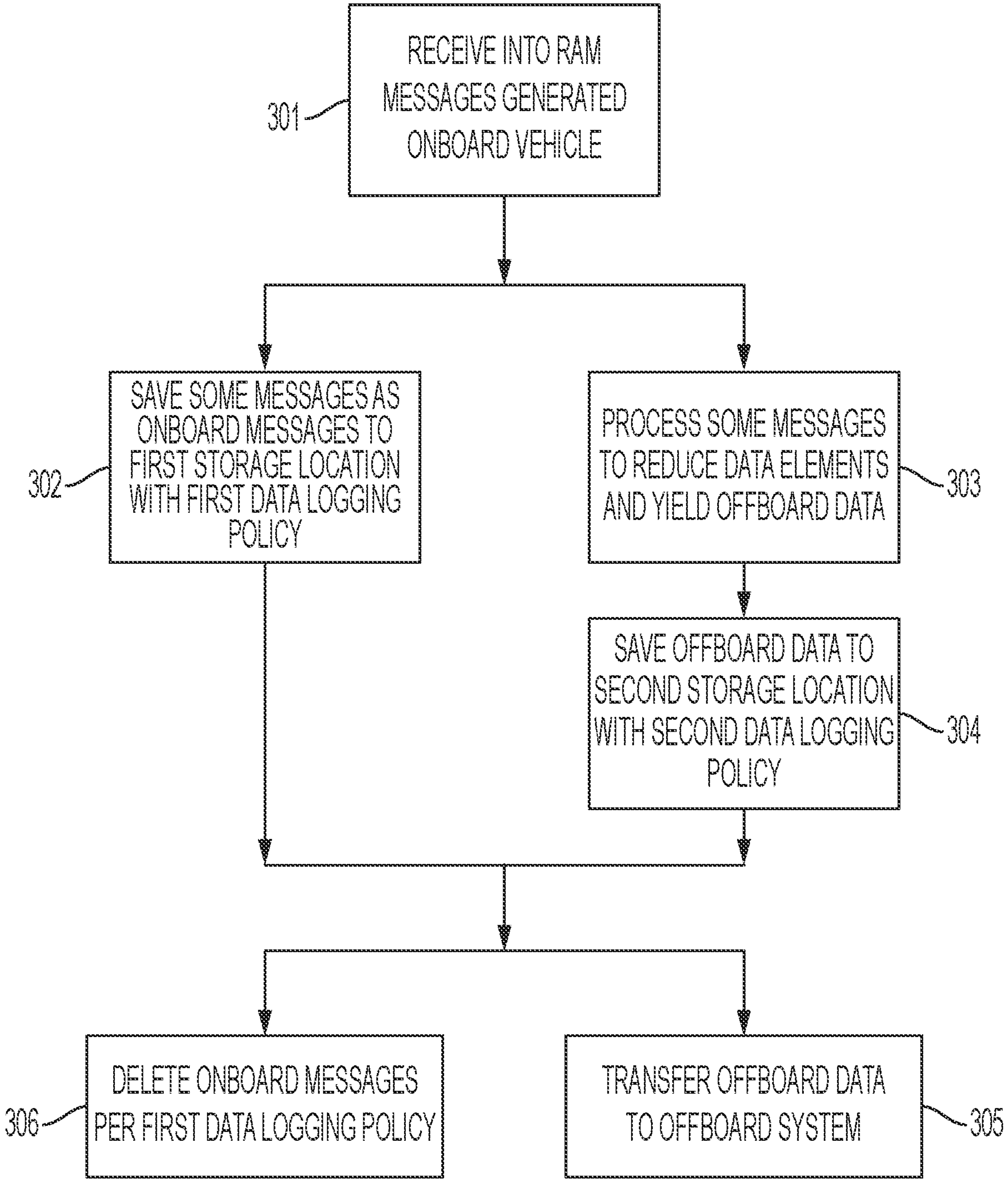
FIG. 3 is a flowchart illustrating a method of managing data generated by vehicle subsystems in accordance with various aspects of this disclosure.

FIG. 3 is a flow diagram that illustrates various functions of the translation layer that decouples offboard and onboard data. At 301 a system including a processor that is onboard the vehicle will receive messages generated by one or more of the vehicle's subsystems. The system will initially receive the messages into a volatile memory such as a random access memory (RAM). The processor will then perform the data scribe task as will now be described. At 302 the processor will save at least some of these messages as a first set of messages (which this document may refer to as "onboard messages") to a first memory that is onboard the vehicle, and it will apply a first data logging policy to the onboard messages. The first data logging policy will define one or more parameters for storage of the onboard messages. Each parameter will be a condition that, when satisfied, will signal that the processor may delete the onboard message. Such conditions may include the occurrence of an event, such as the expiration of a period of time, the collection of a replacement message having one or more data elements matching that of the onboard message, a situation in which less than a minimum amount of memory space remains, and/or other conditions. While the onboard messages are stored in the first memory, one or more of the vehicle's subsystems may use the messages, along with data within the messages, for vehicle operation, for data analysis, and/or for other purposes.

At 303 the processor also may review some or all of the received messages (i.e., a second set of messages, which may or may not include some or all of the messages of first set) to reduce the number of data elements in the second set of messages, thus yielding data to be transferred to a remote system for offboard use. This document will refer to such data as "offboard data", in the sense that these messages are designed specifically for offboard data analysis. This is in contrast to what the document is calling "onboard messages", which are the messages that are being held in storage for a relatively short period of time to be passed between processes onboard the vehicle. Note that despite "offboard" being in the name "offboard data", this data is still being created onboard; the term is merely being used to indicate that this data, unlike the "onboard messages", is not meant to be used as input for any onboard vehicle operation processes. At 304 the processor will save the offboard data to a second storage location, subject to a second data logging policy. The offboard data also may be in the form of messages (i.e., as offboard messages), or it may have some other data structure. The first storage location and the second storage location may be separate storage devices, separate storage sectors of a single device or group of devices, or even separate data groupings (such as separate databases) within a single device or group of devices. The first data logging policy and the second data logging policy will differ from each other, as will be described in more detail below.

To process the received messages at 303 to yield offboard data, the system may apply various rule-based processes to the received messages' data elements. Examples of these processes will now be described.

As a first example, consider the issue of content misalignment (i.e., the situation in which onboard messages contain more data elements than are needed for offboard analysis).

A received message may contain multiple data fields, each of which is associated with a corresponding category. To address the issue of content misalignment the system may maintain a data schema indicating which data categories are necessary for offboard analysis. Then, when processing received messages at 303, the processor may extract only that data (i.e., the data in fields matching fields, or associated with categories, necessary for offboard analysis) and include the extracted data in the offboard data. In addition, if all of the data fields of a received message are fields, or are associated with categories, that are needed for offboard analysis, but none of the data is needed for additional onboard operations, the system may simply extract the entire message and move it to the second storage location. It may concurrently delete the received message from the non-volatile memory, or it may flag the received message for deletion after a period of time elapses (for example, less than 1 second).

As a second example, consider the issue of message logging misalignment (i.e., the situation in which messages are received at a higher frequency than offboard analysis requires, or vice versa). To address message logging misalignment, the system may downsample received messages and extract, from the received messages, a subset of the received messages at the needed offboard frequency. By way of example, if a vehicle subsystem generates a particular message at a frequency of 10 Hz, but a frequency of 1 Hz would yield sufficient data for offboard analysis, the system may extract every tenth generated message and save only those messages to the second storage location as offboard messages.

As a fourth example, the system may apply semantic analysis to the received messages to identify contextually similar data elements of multiple messages in the set. For each of the groups of contextually similar data elements, the system may include fewer than all of the onboard message data elements in the offboard messages, thus avoiding the storage cost of saving duplicative data. For example, if a first received message includes a parked_vehicle data element, which indicates that the vehicle's perception system detected a parked vehicle at a particular location, and multiple subsequent received messages also include the same parked_vehicle data element, the system may include only that data element of the first received message, and not any of the future duplicative data elements, in the offboard data.

As a fourth example, the system may implement a hybrid of any of the approaches above. For example, the system may downsample individual categories of data within the messages, so that certain data elements within received messages are retained at a lower frequency for offboard storage.

As an additional option, rather than processing all received messages at step 303, the system may process only the messages that are saved (or that are identified to be saved) as onboard messages to the first storage location in step 302.

In any of the examples above, the system may include a user interface that enables the system to receive one or more rules or parameters for extracting data for the offboard data.

As noted above, when saving the onboard messages with the first data logging policy at 302 and saving the offboard data with the second data logging policy at 304, the first data logging policy and the second data logging policy will differ from each other. For example, the first data logging policy may require that a condition be satisfied if the system is to retain the onboard message in the memory more than a very short threshold period of time (for example, less than 1 second), while the second data logging policy may not require such a condition and thus may retain the offboard data for a longer period of time. Note that the "first data logging policy" and "second data logging policy" may each be a group of policies, in which various data logging rules are maintained for various categories of data. For example, the first data logging policy may include a rule to save data that the translation layer receives from the vehicle's perception channel (i.e., the actual sensor data) for a storage period (and/or at a frequency) that is greater or less than that received from the vehicle's inference channel (i.e., the channel that predicts what a detected object may do).

Figure 4:
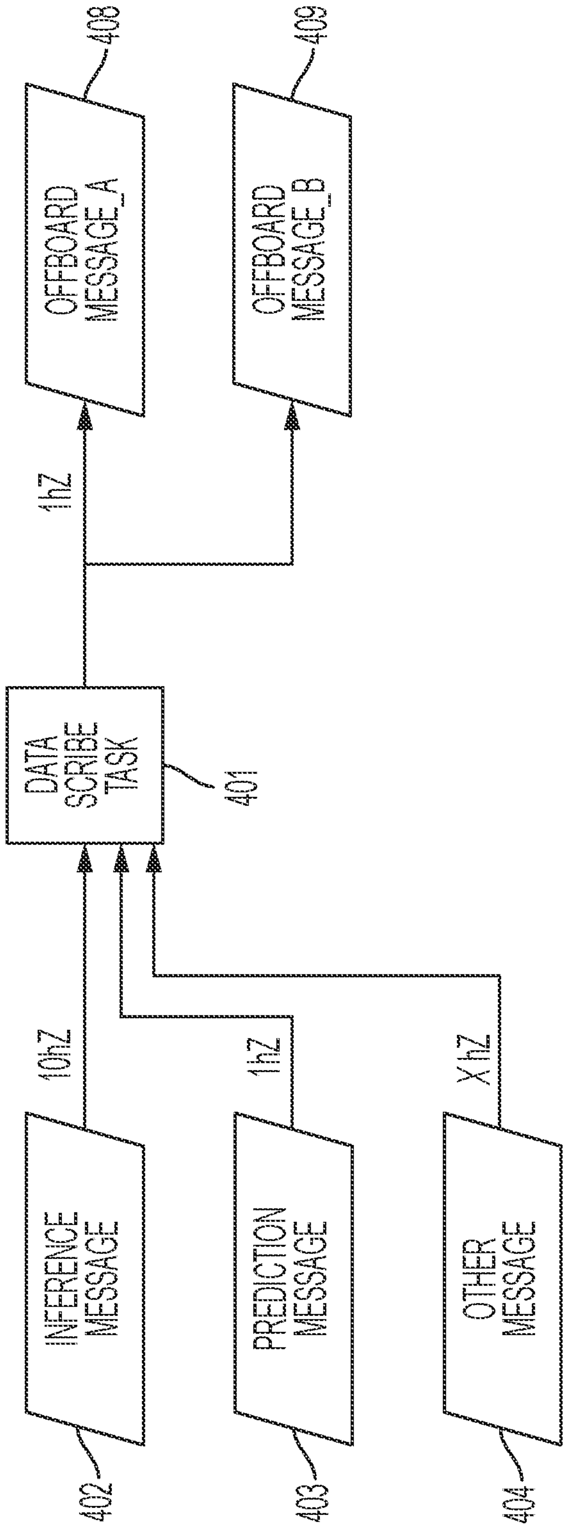
FIG. 4 is a process flow diagram further illustrating methods of managing data in accordance with various aspects of this disclosure.

This is illustrated by way of example with reference to FIG. 4, which is a block diagram showing how a translation layer (shown as data scribe task 401) will receive data from various channels 402-404 within the vehicle. In this document, the term "channel" has the generally known meaning in the context of a publish-subscribe model, in which the vehicle subsystems are publishers of the data, and the data scribe task 401 is a subscriber to that data.

In FIG. 4, the data scribe task 401 subscribes to, and receives messages from, an inference_message channel 402, a prediction_message channel 403, and any number of other channels 404 that publish data that one or more of the vehicle's subsystems generate. The data scribe task 401 receives messages from the inference_message channel 402 at a message rate of 10 Hz and downsamples that data to a message rate of 1 Hz to yield a smaller subset of messages. The data scribe task 401 saves the downsampled data to the offboard storage in a group of offboard message_A messages 408.

The data scribe task 401 also receives messages from the prediction_message channel 403 and does not reduce its message rate but instead extracts data elements of specific categories. This yields a set of offboard_message B 409 messages that have fewer data elements than the incoming messages from the prediction_message channel 403.

Optionally, the system may apply a combination of any or all of the actions described above to any channel's messages so that some of the channel's message data elements are saved for offboard use at a relatively higher data rate while other data elements of the channel's messages are saved for offboard use at a relatively lower data rate.

Returning to FIG. 3, once the processing of received messages to yield offboard data is complete, at 305 the system may transfer the offboard data to a remote, offboard system for analysis and thus delete the offboard data from the second storage location according to the second data logging policy. At 306 the system may delete the onboard messages according to the first data logging policy.

Optionally, the data scribe task may be configured to handle incoming message anomalies. For example, if incoming messages on a channel are delayed or not received, the data scribe task may publish empty messages to the second (offboard) memory at the required frequency.

FIG. 5 illustrates an example system architecture 500 for a vehicle, in accordance with aspects of the disclosure. Vehicles 102 and/or 103 of FIG. 1 can have the same or similar system architecture as that shown in FIG. 5. Thus, the following discussion of system architecture 500 is sufficient for understanding vehicle(s) 102, 103 of FIG. 1. However, other types of vehicles are considered within the scope of the technology described in this document and may contain more or less elements as described in association with FIG. 5. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 5, system architecture 500 for a vehicle includes an engine or motor 502 and various sensors 504-518 for measuring various parameters of the vehicle. In gas-powered or hybrid vehicles having a fuel-powered engine, the sensors may include, for example, an engine temperature sensor 504, a battery voltage sensor 506, an engine revolutions per minute ("RPM") sensor 508, and a throttle position sensor 510. If the vehicle is an electric or hybrid vehicle, then the vehicle may have an electric motor, and accordingly includes sensors such as a battery monitoring system 512 (to measure current, voltage and/or temperature of the battery), motor current 514 and voltage 516 sensors, and motor position sensors 518 such as resolvers and encoders.

Operational parameter sensors that are common to both types of vehicles include, for example: a position sensor 536 such as an accelerometer, gyroscope and/or inertial measurement unit; a speed sensor 538; and an odometer sensor 540. The vehicle also may have a clock 542 that the system uses to determine vehicle time during operation. The clock 542 may be encoded into the vehicle on-board computing device, it may be a separate device, or multiple clocks may be available.

The vehicle also may include various sensors that operate to gather information about the environment in which the vehicle is traveling. These sensors may include, for example: a location sensor 560 (such as a Global Positioning System ("GPS") device); object detection sensors such as one or more cameras 562; a lidar system 564; and/or a radar and/or a sonar system 566. The sensors also may include environmental sensors 568 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 520. The on-board computing device 520 may be implemented using the computer system of FIG. 6. The vehicle on-board computing device 520 analyzes the data captured by the sensors and optionally controls operations of the vehicle based on results of the analysis. For example, the vehicle on-board computing device 520 may control: braking via a brake controller 522; direction via a steering controller 524; speed and acceleration via a throttle controller 526 (in a gas-powered vehicle) or a motor speed controller 528 (such as a current level controller in an electric vehicle); a differential gear controller 530 (in vehicles with transmissions); and/or other controllers. Auxiliary device controller 554 may be configured to control one or more auxiliary devices, such as testing systems, auxiliary sensors, mobile devices transported by the vehicle, etc.

Geographic location information may be communicated from the location sensor 560 to the on-board computing device 520, which may then access a map of the environment that corresponds to the location information to determine known fixed features of the environment such as streets, buildings, stop signs and/or stop/go signals. Captured images from the cameras 562 and/or object detection information captured from sensors such as lidar system 564 is communicated from those sensors) to the on-board computing device 520. The object detection information and/or captured images are processed by the on-board computing device 520 to detect objects in proximity to the vehicle. Any known or to be known technique for making an object detection based on sensor data and/or captured images can be used in the embodiments disclosed in this document.

Lidar information is communicated from lidar system 564 to the on-board computing device 520. Additionally, captured images are communicated from the camera(s) 562 to the vehicle on-board computing device 520. The lidar information and/or captured images are processed by the vehicle on-board computing device 520 to detect objects in proximity to the vehicle. The manner in which the object detections are made by the vehicle on-board computing device 520 includes such capabilities detailed in this disclosure.

In addition, the system architecture 500 may include an onboard display device 532 that may generate and output an interface on which sensor data, vehicle status information, or outputs generated by the processes described in this document are displayed to an occupant of the vehicle. The display device may include, or a separate device may be, an audio speaker that presents such information in audio format.

The on-board computing device 520 may include and/or may be in communication with a routing controller 531 that generates a navigation route from a start position to a destination position for an autonomous vehicle. The routing controller 531 may access a map data store to identify possible routes and road segments that a vehicle can travel on to get from the start position to the destination position. The routing controller 531 may score the possible routes and identify a preferred route to reach the destination. For example, the routing controller 531 may generate a navigation route that minimizes Euclidean distance traveled or other cost function during the route, and may further access the traffic information and/or estimates that can affect an amount of time it will take to travel on a particular route. Depending on implementation, the routing controller 531 may generate one or more routes using various routing methods, such as Dijkstra's algorithm, Bellman-Ford algorithm, or other algorithms. The routing controller 531 may also use the traffic information to generate a navigation route that reflects expected conditions of the route (e.g., current day of the week or current time of day, etc.), such that a route generated for travel during rush-hour may differ from a route generated for travel late at night. The routing controller 531 may also generate more than one navigation route to a destination and send more than one of these navigation routes to a user for selection by the user from among various possible routes.

In various embodiments, the on-board computing device 520 may determine perception information of the surrounding environment of the vehicle. Based on the sensor data provided by one or more sensors and location information that is obtained, the on-board computing device 520 may determine perception information of the surrounding environment of the vehicle. The perception information may represent what an ordinary driver would perceive in the surrounding environment of a vehicle. The perception data may include information relating to one or more objects in the environment of the vehicle. For example, the on-board computing device 520 may process sensor data (e.g., lidar or radar data, camera images, etc.) in order to identify objects and/or features in the environment of vehicle. The objects may include traffic signals, roadway boundaries, other vehicles, pedestrians, and/or obstacles, etc. The on-board computing device 520 may use any now or hereafter known object recognition algorithms, video tracking algorithms, and computer vision algorithms (e.g., track objects frame-to-frame iteratively over a number of time periods) to determine the perception.

In some embodiments, the on-board computing device 520 may also determine, for one or more identified objects in the environment, the current state of the object. The state information may include, without limitation, for each object: current location; current speed and/or acceleration, current heading; current pose; current shape, size, or footprint; type (for example: vehicle, pedestrian, bicycle, static object or obstacle); and/or other state information.

The on-board computing device 520 may perform one or more prediction and/or forecasting operations. For example, the on-board computing device 520 may predict future locations, trajectories, and/or actions of one or more objects. For example, the on-board computing device 520 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the vehicle, the surrounding environment, and/or their relationship(s). For example, if an object is a vehicle and the current driving environment includes an intersection, the on-board computing device 520 may predict whether the object will likely move straight forward or make a turn. If the perception data indicates that the intersection has no traffic light, the on-board computing device 520 may also predict whether the vehicle may have to fully stop prior to entering the intersection.

In various embodiments, the on-board computing device 520 may determine a motion plan for the autonomous vehicle. For example, the on-board computing device 520 may determine a motion plan for the autonomous vehicle based on the perception data and/or the prediction data. Specifically, given predictions about the future locations of proximate objects and other perception data, the on-board computing device 520 can determine a motion plan for the vehicle that best navigates the autonomous vehicle relative to the objects at their future locations.

In some embodiments, the on-board computing device 520 may receive predictions and make a decision regarding how to handle objects and/or actors in the environment of the vehicle. For example, for a particular actor (e.g., a vehicle with a given speed, direction, turning angle, etc.), the on-board computing device 520 decides whether to overtake, yield, stop, and/or pass based on, for example, traffic conditions, map data, state of the autonomous vehicle, etc. Furthermore, the on-board computing device 520 also plans a path for the vehicle to travel on a given route, as well as driving parameters (e.g., distance, speed, and/or turning angle). That is, for a given object, the on-board computing device 520 decides what to do with the object and determines how to do it. For example, for a given object, the on-board computing device 520 may decide to pass the object and may determine whether to pass on the left side or right side of the object (including motion parameters such as speed). The on-board computing device 520 may also assess the risk of a collision between a detected object and the vehicle. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 520 may execute one or more control instructions to perform a cautious maneuver (e.g., mildly slow down, accelerate, change lane, or swerve). In contrast, if the collision cannot be avoided, then the on-board computing device 520 may execute one or more control instructions for execution of an emergency maneuver (e.g., brake and/or change direction of travel).

As discussed above, planning and control data regarding the movement of the autonomous vehicle is generated for execution. The on-board computing device 520 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 6:
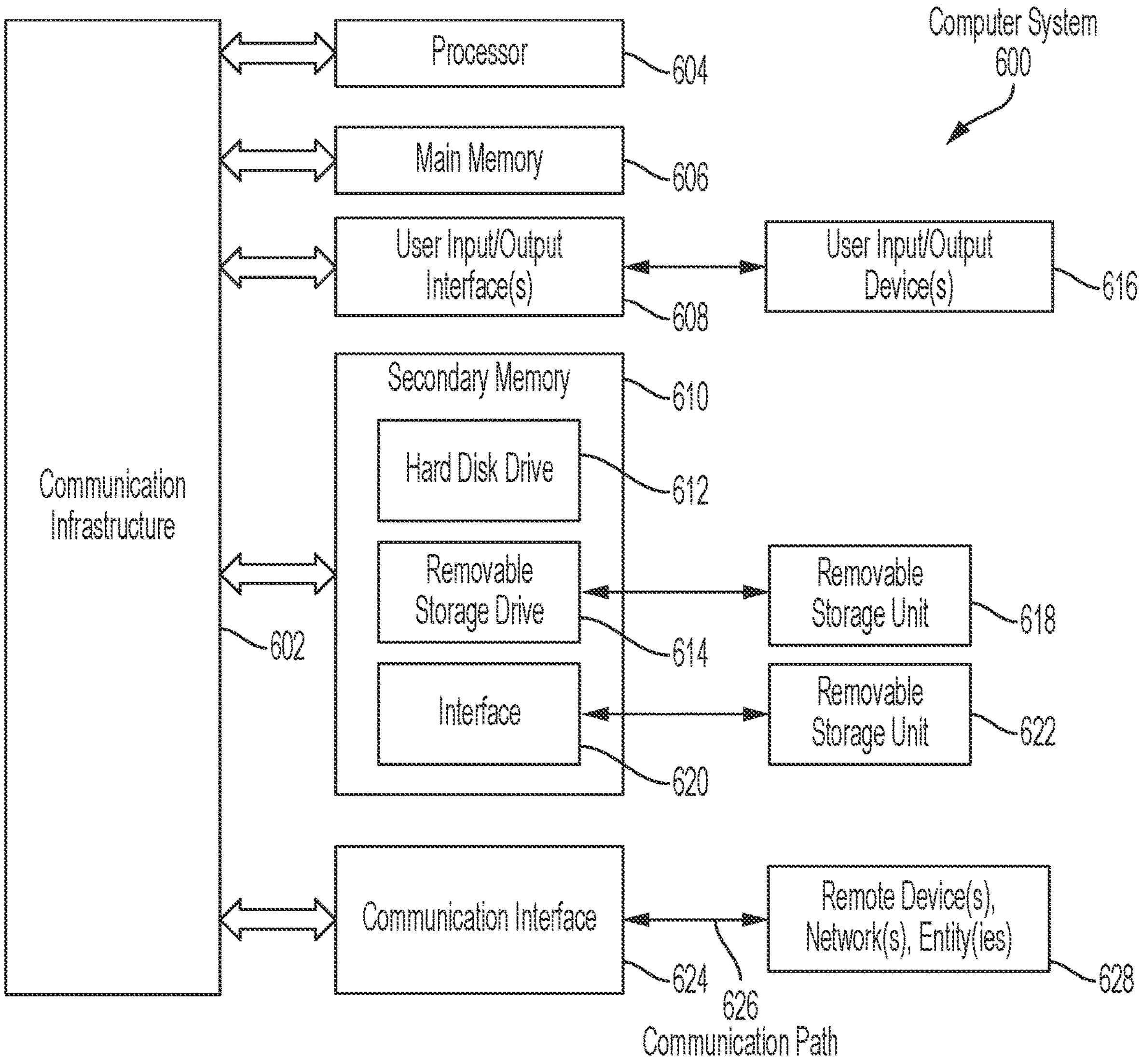
FIG. 6 is an example computer system useful for implementing various embodiments.

The onboard computing device and/or offboard (remote) computing devices may be using one or more computer systems, such as computer system 600 shown in FIG. 6. Computer system 600 can be any computer capable of performing the functions described in this document.

Computer system 600 includes one or more processors (also called central processing units, or CPUs), such as a processor 604. Processor 604 is connected to a communication infrastructure or bus 602. Optionally, one or more of the processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 616, such as monitors, keyboards, pointing devices, etc., that communicate with communication infrastructure 602 through user input/output interface(s) 608.

Computer system 600 also includes a main or primary memory 606, such as random access memory (RAM). Main memory 606 may include one or more levels of cache. Main memory 606 has stored therein control logic (i.e., computer software) and/or data.

Computer system 600 may also include one or more secondary storage devices or memory 610. In some embodiments of this disclosure, main memory 606 may be considered the first memory and secondary memory 610 may be considered the second memory, or vice versa. Alternatively, secondary memory 606 may include multiple subcomponents that together serve as the first memory and the second memory. Secondary memory 610 may include, for example, a hard disk drive 612 and/or a removable storage device or drive 614. Removable storage drive 614 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be an external hard drive, a universal serial bus (USB) drive, a memory card such as a compact flash card or secure digital memory, a floppy disk, a magnetic tape, a compact disc, a DVD, an optical storage disk, and/any other computer data storage device. Removable storage drive 614 reads from and/or writes to removable storage unit 618 in any suitable known manner.

According to an example embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In some embodiments, a tangible, non-transitory apparatus or article of manufacture comprising a tangible, non-transitory computer useable or readable medium having control logic (software) stored thereon is also referred to in this document as a computer program product or program storage device. This includes, but is not limited to, computer system 600, main memory 606, secondary memory 610, and removable storage units 618 and X22, as well as tangible articles of manufacture embodying any combination of the foregoing. Such control logic, when executed by one or more data processing devices (such as computer system 600), causes such data processing devices to operate as described in this document.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described in this document. The features from different embodiments disclosed herein may be freely combined. For example, one or more features from a method embodiment may be combined with any of the system or product embodiments. Similarly, features from a system or product embodiment may be combined with any of the method embodiments herein disclosed.

As described above, this document discloses system, method, and computer program product embodiments for managing data generated by one or more systems of a vehicle. The system embodiments include a first storage location and a second location on the vehicle, as well as a processor that is onboard the vehicle. The computer program embodiments include programming instructions (e.g., stored in a memory), to cause a processor to perform the data management methods described in this document. The system embodiments also include a processor which is configured to perform the data management methods described in this document, e.g., via the programming instructions. More generally, the system embodiments include a system comprising means to perform the steps of the any of the methods described in this document.

In various embodiments, the data management methods include, by the processor that is onboard the vehicle, receiving a plurality of messages generated by one or more systems onboard the vehicle, wherein each of the received messages comprises a plurality of data elements. The processor will save a first set of the received messages to a first storage location that is onboard the vehicle as onboard messages, in which the onboard messages are subject to a first data logging policy. The processor will process a second set of the received messages to reduce a total number of the data elements in the second set, yielding offboard data that is designated for offboard use. The processor will save the offboard data to a second storage location that is onboard the vehicle in which the one or more offboard data subject to a second data logging policy, wherein the second data logging policy differs from the first data logging policy.

In some embodiments, the methods also may include transferring the offboard data to an offboard system.

Optionally, in any of the embodiments described above, the received messages may be generated by the subsystem at a first frequency, and processing at least some of the received messages to reduce the total number of data elements in the second set may include downsampling the second set to yield a subset of messages corresponding to a second frequency that is lower than the first frequency.

Optionally, in any of the embodiments described above, the data elements may be associated with a plurality of categories, each of the data elements may be associated with one of the categories, and processing at least some of the received messages to reduce the total number of data elements in the second set may include downsampling the data elements for at least one, but not all, of the categories.

Optionally, in any of the embodiments described above, processing at least some of the received messages to reduce the total number of data elements in the second set may include identifying one or more groups of contextually similar data elements of multiple messages in the second set. Then, for each of the groups of contextually similar data elements in the messages of the second set, the processor may include fewer than all of the contextually similar data elements in the offboard data.

Optionally, in any of the embodiments described above, the first data logging policy may include a first storage period, the second data logging policy includes a second storage period, the second storage period is longer than the first storage period, and the method may include deleting each of the onboard messages after the first storage period.

Optionally, in any of the embodiments described above, the first data logging policy may include a condition that each onboard message must satisfy in order to be retained onboard the vehicle, and the second data logging policy may not include the condition.

Optionally, in any of the embodiments described above, the offboard data may be in the form of a set of offboard messages.

In any of the embodiments above, the first set of messages and the second set of messages may be unique sets of messages, or the sets may be identical to each other, or the second set of messages may include some messages that are also in the first set and some messages that are not in the first set.

Terms that are relevant to this disclosure include:

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," and the like each refer to a non-transitory device on which computer-readable data, programming instructions or both are stored. The terms "storage," "storage device," and "disk storage" specifically refer to a non-transitory device, such as a hard drive (HDD) or solid-state drive (SDD), that stores data persistently for a relatively longer period. The term "memory" may be used generally in this document to refer either to a storage device that stores information on a persistent basis, or to a device that stores information on a non-persistent basis such as a random access memory (RAM) device. Except where specifically stated otherwise, the terms "memory," "memory device," "storage," "disk storage," "storage device" and the like are intended to include single device embodiments, embodiments in which multiple devices together or collectively store a set of data or instructions, as well as individual sectors within such devices. A "storage location" is a segment, sector, or portion of a storage device. The relative terms "first storage location" and "second storage location" refer to different storage locations, which may be elements of a single device or elements of multiple devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices. The term "wireless communication" refers to communication between two devices in which at least a portion of the communication path includes a signal that is transmitted wirelessly, but it does not necessarily require that the entire communication path be wireless.

As used in this document, the terms "infer" and "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

The term "object," when referring to an object that is detected by a vehicle perception system or simulated by a simulation system, is intended to encompass both stationary objects and moving (or potentially moving) actors, except where specifically stated otherwise by use of the term "actor" or "stationary object."

In this document, when terms such as "first" and "second" are used to modify a noun, such use is simply intended to distinguish one item from another, and is not intended to require a sequential order unless specifically stated.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes example embodiments for example fields and applications, it should be understood that the disclosure is not limited to the disclosed examples. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described) have significant utility to fields and applications beyond the examples described in this document.

Embodiments have been described in this document with the aid of functional building blocks illustrating the implementation of specified functions and relationships. The boundaries of these functional building blocks have been arbitrarily defined in this document for the convenience of the description. Alternate boundaries can be defined as long as the specified functions and relationships (or their equivalents) are appropriately performed. Also, alternative embodiments can perform functional blocks, steps, operations, methods, etc. using orderings different than those described in in this document.

References in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described in this document. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

Without excluding further possible embodiments, certain example embodiments are summarized in the following clauses:

Clause 1. A computer-implemented method of managing data generated by one or more systems of a vehicle, the method comprising:

receiving a plurality of messages generated by one or more systems onboard the vehicle, wherein each of the received messages comprises a plurality of data elements;

saving a first set of the received messages to a first storage location that is onboard the vehicle as onboard messages, wherein the onboard messages are subject to a first data logging policy;

processing a second set of the received messages to reduce a total number of the data elements in the second set, yielding offboard data that is designated for offboard use; and saving the offboard data to a second storage location that is onboard the vehicle in which the offboard data is subject to a second data logging policy, wherein the second data logging policy differs from the first data logging policy.

Clause 2. The method of clause 1 further comprising transferring the offboard data to an offboard system.

Clause 3. The method of any of the above clauses, wherein:

the received messages were generated by the one or more systems at a first frequency; and processing the second set of messages to reduce the total number of data elements in the second set comprises downsampling the second set to yield a subset of messages corresponding to a second frequency that is lower than the first frequency.

Clause 4. The method of any of the above clauses, wherein:

the data elements are associated with a plurality of categories;

each of the data elements is associated with one of the categories; and processing the second set of messages to reduce the total number of data elements in the second set comprises downsampling the data elements for at least one, but not all, of the categories.

Clause 5. The method of any of the above clauses, wherein processing the second set of messages to reduce the total number of the data elements in the second set comprises:

identifying one or more groups of contextually similar data elements of multiple messages in the messages of the second set; and for each of the groups of contextually similar data elements in the messages of the second set, including fewer than all of the contextually similar data elements in the offboard data.

Clause 6. The method of any of the above clauses, wherein:

the first data logging policy includes a first storage period;

the second data logging policy includes a second storage period;

the second storage period is longer than the first storage period; and the method includes deleting each of the onboard messages after the first storage period.

Clause 7. The method of any of the above clauses, wherein:

the first data logging policy comprises a condition that each onboard message must satisfy in order to be retained onboard the vehicle; and the second data logging policy does not include the condition.

Clause 8. The method of any of the above clauses, wherein the offboard data is in the form of a set of offboard messages.

Clause 9. The method of any of the above clauses, wherein the second set of received messages includes one or more messages that are also in the first set of received messages.

Clause 10. A system comprising means for performing steps of any of the above method clauses.

Clause 11. A computer program, or a storage medium storing the computer program, comprising instructions, which when executed by one or more suitable processors cause any of the processors to perform the steps of any of the above method clauses.

Clause 12. A system, comprising:

a first storage location;

a second storage location;

one or more processors; wherein any one or more of the processors are configured to:

receive a plurality of messages generated by one or more systems onboard a vehicle, wherein each of the received messages comprises a plurality of data elements, save a first set of the messages to the first storage location as onboard messages, wherein the onboard messages are subject to a first data logging policy;

process a second set of the messages to reduce a total number of the data elements in the second set, yielding offboard data that is designated for offboard use; and save the offboard data to the second storage location subject to a second data logging policy, wherein the second data logging policy differs from the first data logging policy.

Clause 13. The system of clause 12, wherein any one or more of the processors are further configured to transfer the offboard data to an offboard system.

Clause 14. The system of any of the above system clauses, wherein any one or more of the processors are further configured to process the second set of messages to reduce the total number of data elements in the second set comprise instructions to downsample the second set to yield a subset of messages corresponding to a second frequency that is lower than a first frequency at which the received messages were received.

Clause 15. The system of any of the above system clauses, wherein any one or more of the processors are further configured to process the second set of messages to reduce the total number of data elements in the second set comprise instructions to downsample the data elements for at least one, but not all, of the categories that are associated with the data elements.

Clause 16. The system of any of the above system clauses, wherein any one or more of the processors are further configured to process the second set of messages to reduce the total number of data elements in the second set comprise instructions to:

identify one or more groups of contextually similar data elements of multiple messages in the second set of messages; and for each of the groups of contextually similar data elements in the messages of the second set, include fewer than all of the contextually similar data elements in the offboard data.

Clause 17. The system of any of the above system clauses, wherein:

the first data logging policy includes a first storage period;

the second data logging policy includes a second storage period;

the second storage period is longer than the first storage period; and wherein any one or more of the processors are configured to delete each of the onboard messages after the first storage period.

Clause 18. The system of any of the above system clauses, wherein:

the first data logging policy comprises a condition that each onboard message must satisfy in order to be retained in the first storage location; and the second data logging policy does not include the condition.

Clause 19. The system of any of the above system clauses, wherein the offboard data is in the form of a set of offboard messages.

Clause 20. A computer program product, or a computer-readable medium that stores the computer program product, comprising instructions when executed by one or more computing devices, will cause any of the computing devices to perform operations comprising:

receive a plurality of messages generated by one or more systems onboard a vehicle, wherein each of the received messages comprises a plurality of data elements;

save a first set of the received messages to the first storage location as onboard messages, wherein the onboard messages are subject to a first data logging policy;

process a second set of the received messages to reduce a total number of the data elements in the second set, yielding offboard data that is designated for offboard use; and save the offboard data to the second storage location subject to a second data logging policy, wherein the second data logging policy differs from the first data logging policy.

Clause 21. The computer program product of clause 18 wherein the instructions to process the second set of messages to reduce the total number of data elements in the second set comprise instructions to perform one or more of the following:

downsample the second set of messages to yield a subset of messages corresponding to a second frequency that is lower than a first frequency at which the received messages were received;

downsample the data elements for at least one, but not all, of the categories that are associated with the data elements; or identify one or more groups of contextually similar data elements of multiple messages in the second set of messages and, for each of the groups of contextually similar data elements in the messages of the second set, include fewer than all of the contextually similar data elements in the offboard data.

Clause 22. The computer program product of any of the above product clauses, wherein:

the first data logging policy includes a first storage period;

the second data logging policy includes a second storage period;

the second storage period is longer than the first storage period; and the instructions further comprise instructions to delete each of the onboard messages after the first storage period.

The invention claimed is:

1. A method of managing data generated by one or more systems of a vehicle, the method comprising:

by one or more systems that are onboard a vehicle, wherein the one or more systems comprise a perception system of the vehicle, a forecasting system of the vehicle, a motion planning system of the vehicle, or a control system of the vehicle:

generating data elements during and relating to operation of the vehicle, and generating messages at a first frequency, wherein each of the messages comprises a plurality of the data elements; and by a processor that is onboard the vehicle:

receiving the plurality of messages generated by the one or more systems onboard the vehicle, saving a first set of the received messages to a first storage location that is onboard the vehicle as onboard messages according to a first data logging policy that defines one or more parameters for storage of the onboard messages, wherein each parameter comprises a condition that, when satisfied, will signal that the processor may delete the onboard message, processing a second set of the received messages to reduce a total number of the data elements in the second set by downsampling the second set of messages to yield a subset of messages corresponding to a second frequency that is lower than the first frequency, yielding offboard data that is designated for offboard use, and saving the offboard data to a second storage location that is onboard the vehicle in which the offboard data is subject to a second data logging policy that defines one or more parameters for storage of the offboard data, wherein;

the second data logging policy differs from the first data logging policy;

the first data logging policy includes a first storage period;

the second data logging policy includes a second storage period; and the second storage period is longer than the first storage period, and deleting each of the onboard messages after the first storage period.

2. The method of claim 1 further comprising transferring the offboard data to an offboard system.

3. The method of claim 1, wherein:

the data elements are associated with a plurality of categories, each of the data elements is associated with one of the categories, and processing the second set of messages to reduce a total number of the data elements in the second set comprises the data elements for at least one, but not all, of the categories.

4. The method of claim 1, wherein processing the second set of messages to reduce the total number of the data elements in the second set comprises:

identifying one or more groups of semantically similar data elements of multiple messages in the messages of the second set; and for each of the groups of semantically similar data elements in the messages of the second set, including fewer than all of the semantically similar data elements in the offboard data.

5. The method of claim 1, wherein:

the first data logging policy comprises a condition that each onboard message must satisfy in order to be retained onboard the vehicle; and the second data logging policy does not include the condition.

6. The method of claim 1, wherein the offboard data is in the form of a set of offboard messages.

7. The method of claim 1, wherein the second set of received messages includes one or more messages that are also in the first set of received messages.

8. A system, comprising:

a vehicle comprising:

one or more systems that are configured to generate data elements during and relating to operation of the vehicle, wherein the one or more systems comprise a perception system of the vehicle, a forecasting system of the vehicle, a motion planning system of the vehicle, or a control system of the vehicle;

at least one processor;

a first storage location; and programming instructions stored in a memory and configured to cause the processor to, in response to receiving a plurality of messages generated by one or more of the systems onboard the vehicle, wherein each of the received messages comprises a plurality of the data elements and is received at a first frequency:

save a first set of the messages to the first storage location as onboard messages according to a first data logging policy that defines one or more parameters for storage of the onboard messages, wherein each parameter comprises a condition that, when satisfied, will signal that the processor may delete the onboard message, process a second set of the messages to reduce a total number of the data elements in the second set by downsampling the second set to yield a subset of messages corresponding to a second frequency that is lower than the first frequency, yielding offboard data that is designated for offboard use, save the offboard data to an offboard second storage location subject to a second data logging policy that defines one or more parameters for storage of the offboard data, wherein:

the second data logging policy differs from the first data logging policy;

the first data logging policy includes a first storage period;

the second data logging policy includes a second storage period; and the second storage period is longer than the first storage period, and delete each of the onboard messages after the first storage period.

9. The system of claim 8, further comprising additional programming instructions that are configured to cause the processor to transfer the offboard data to an offboard system.

10. The system of claim 8, wherein the instructions to process the second set of messages to reduce the total number of data elements in the second set comprise instructions to downsample the data elements for at least one, but not all, of the categories that are associated with the data elements.

11. The system of claim 8, wherein the instructions to process the second set of messages to reduce the total number of data elements in the second set comprise instructions to:

identify one or more groups of semantically similar data elements of multiple messages in the second set of messages; and for each of the groups of semantically similar data elements in the messages of the second set, include fewer than all of the semantically similar data elements in the offboard data.

12. The system of claim 8, wherein:

the first data logging policy comprises a condition that each onboard message must satisfy in order to be retained in the first storage location; and the second data logging policy does not include the condition.

13. The system of claim 8, wherein the offboard data is in the form of a set of offboard messages.

14. A computer program product comprising a non-transitory computer-readable medium that stores instructions that, when executed by a computing device that is onboard a vehicle, will cause the computing device to perform operations comprising:

generate data elements during and relating to operation of the vehicle, wherein the generating is done by a perception system of the vehicle, a forecasting system of the vehicle, a motion planning system of the vehicle, or a control system of the vehicle; generate a plurality of messages at a first frequency, wherein each of the messages comprises a plurality of the data elements;

save a first set of the messages to a first storage location as onboard messages according to a first data logging policy that defines one or more parameters for storage of the messages of the first set, wherein each parameter comprises a condition that, when satisfied, will signal that the processor may delete the onboard message;

process a second set of the received messages to reduce a total number of the data elements in the second set by downsampling the second set to yield a subset of messages corresponding to a second frequency that is lower than the first frequency, yielding offboard data that is designated for offboard use; and save the offboard data to a second storage location subject to a second data logging policy that defines one or more parameters for storage of the offboard data, wherein;

the second data logging policy differs from the first data logging policy, the first data logging policy includes a first storage period, the second data logging policy includes a second storage period, and the second storage period is longer than the first storage period; and delete each of the onboard messages after the first storage period.

15. The computer program product of claim 14 wherein the instructions to process the second set of messages to reduce the total number of data elements in the second set comprise further instructions to perform one or more of the following:

downsample the data elements for at least one, but not all, of the categories that are associated with the data elements; or identify one or more groups of semantically similar data elements of multiple messages in the second set of messages and, for each of the groups of semantically similar data elements in the messages of the second set, include fewer than all of the semantically similar data elements in the offboard data.

16. A method of managing data generated by one or more systems of a vehicle, the method comprising:

by one or more systems that are onboard a vehicle, wherein the one or more systems comprise a perception system of the vehicle, a forecasting system of the vehicle, a motion planning system of the vehicle, or a control system of the vehicle:

generating data elements during and relating to operation of the vehicle, and generating messages at a first frequency, wherein each of the messages comprises a plurality of the data elements; and by a processor that is onboard the vehicle:

receiving the plurality of messages generated by the one or more systems onboard the vehicle, saving a first set of the received messages to a first storage location that is onboard the vehicle as onboard messages according to a first data logging policy that defines one or more parameters for storage of the onboard messages, wherein each parameter comprises a condition that, when satisfied, will signal that the processor may delete the onboard message, processing a second set of the received messages to reduce a total number of the data elements in the second set by downsampling the messages comprising data elements for at least one, but not all, of the categories in the messages of the second set to yield a subset of messages corresponding to a second frequency that is lower than the first frequency, yielding offboard data that is designated for offboard use, and saving the offboard data to a second storage location that is onboard the vehicle in which the offboard data is subject to a second data logging policy that defines one or more parameters for storage of the offboard data, wherein the second data logging policy differs from the first data logging policy.

17. The method of claim 16 further comprising transferring the offboard data to an offboard system.

18. The method of claim 16, wherein processing the second set of messages to reduce the total number of the data elements in the second set comprises:

identifying one or more groups of semantically similar data elements of multiple messages in the messages of the second set; and for each of the groups of semantically similar data elements in the messages of the second set, including fewer than all of the semantically similar data elements in the offboard data.

19. The method of claim 1, wherein:

the first data logging policy comprises a condition that each onboard message must satisfy in order to be retained onboard the vehicle; and the second data logging policy does not include the condition.

20. A system, comprising:

a vehicle comprising:

one or more systems that are configured to generate data elements during and relating to operation of the vehicle, wherein the one or more systems comprise a perception system of the vehicle, a forecasting system of the vehicle, a motion planning system of the vehicle, or a control system of the vehicle, at least one processor, a first storage location; and programming instructions stored in a memory and configured to cause the processor to, in response to receiving a plurality of messages generated by one or more the systems onboard the vehicle, wherein each of the received messages comprises a plurality of the data elements and is received at a first frequency:

save a first set of the messages to the first storage location as onboard messages according to a first data logging policy that defines one or more parameters for storage of the onboard messages, wherein each parameter comprises a condition that, when satisfied, will signal that the processor may delete the onboard message, process a second set of the messages to reduce a total number of the data elements in the second set by downsampling the messages comprising data elements for at least one, but not all, of the categories in the messages of the second set to yield a subset of messages corresponding to a second frequency that is lower than the first frequency, yielding offboard data that is designated for offboard use, and save the offboard data to an offboard second storage location subject to a second data logging policy that defines one or more parameters for storage of the offboard data, wherein the second data logging policy differs from the first data logging policy.

21. The system of claim 20, further comprising additional programming instructions that are configured to cause the processor to transfer the offboard data to an offboard system.

22. The system of claim 20, wherein the instructions to process the second set of messages to reduce the total number of data elements in the second set comprise instructions to:

identify one or more groups of semantically similar data elements of multiple messages in the second set of messages; and for each of the groups of semantically similar data elements in the messages of the second set, include fewer than all of the semantically similar data elements in the offboard data.

23. The system of claim 20, wherein:

the first data logging policy comprises a condition that each onboard message must satisfy in order to be retained in the first storage location; and the second data logging policy does not include the condition.

24. A computer program product comprising a non-transitory computer-readable medium that stores instructions that, when executed by a computing device that is onboard a vehicle, will cause the computing device to perform operations comprising:

generate data elements during and relating to operation of the vehicle, wherein the generating is done by a perception system of the vehicle, a forecasting system of the vehicle, a motion planning system of the vehicle, or a control system of the vehicle;

generate a plurality of messages at a first frequency, wherein each of the messages comprises a plurality of the data elements;

save a first set of the messages to a first storage location as onboard messages according to a first data logging policy that defines one or more parameters for storage of the messages of the first set, wherein each parameter comprises a condition that, when satisfied, will signal that the processor may delete the onboard message;

process a second set of the received messages to reduce a total number of the data elements in the second set by downsampling the messages comprising data elements for at least one, but not all, of the categories in the messages of the second set to yield a subset of messages corresponding to a second frequency that is lower than the first frequency, yielding offboard data that is designated for offboard use; and save the offboard data to a second storage location subject to a second data logging policy that defines one or more parameters for storage of the offboard data, wherein the second data logging policy differs from the first data logging policy.

* * * * *